(12) United States Patent
Yagi et al.

(10) Patent No.: US 12,067,922 B2
(45) Date of Patent: Aug. 20, 2024

(54) DISPLAY CONTROL DEVICE, DISPLAY CONTROL METHOD, AND DISPLAY CONTROL PROGRAM

(71) Applicant: Nippon Telegraph and Telephone Corporation, Tokyo (JP)

(72) Inventors: Sayaka Yagi, Musashino (JP); Kimio Tsuchikawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 244 days.

(21) Appl. No.: 17/626,054

(22) PCT Filed: Jul. 12, 2019

(86) PCT No.: PCT/JP2019/027815
§ 371 (c)(1),
(2) Date: Jan. 10, 2022

(87) PCT Pub. No.: WO2021/009819
PCT Pub. Date: Jan. 21, 2021

(65) Prior Publication Data
US 2022/0319377 A1    Oct. 6, 2022

(51) Int. Cl.
*G06F 16/00* (2019.01)
*G06F 16/9038* (2019.01)
(Continued)

(52) U.S. Cl.
CPC ....... *G09G 3/2003* (2013.01); *G06F 16/9038* (2019.01); *G06Q 10/0637* (2013.01);
(Continued)

(58) Field of Classification Search
CPC ......... G09G 3/2003; G09G 2320/0666; G09G 2320/10; G06F 16/9038; G06Q 10/0637
See application file for complete search history.

(56) References Cited

U.S. PATENT DOCUMENTS

2012/0262472 A1* 10/2012 Garr ................... G06T 11/206
345/589
2014/0200930 A1* 7/2014 Zizzamia ............. G16H 50/50
705/4
(Continued)

FOREIGN PATENT DOCUMENTS

CN         102227748 A  * 10/2011  ........... G06K 9/4671
WO    WO-2010064939 A1 *  6/2010  ....... G06F 17/30061
(Continued)

OTHER PUBLICATIONS

Bertin et al., "Semiology of graphics: diagrams, networks, maps," Madison: University of Wisconsin Press, 1983, 1:42-97, 58 pages.
(Continued)

*Primary Examiner* — Leslie Wong
(74) *Attorney, Agent, or Firm* — Fish & Richardson P.C.

(57) ABSTRACT

A display control device includes processing circuitry configured to store index setting information indicating combinations of a plurality of indexes and importance of each of the indexes, and visual variable setting information indicating a visual variable used when a value of the index of the importance is displayed for each importance on a heatmap, calculate values of the indexes collectively on a display basis on the heatmap, specify the combinations of the plurality of indexes and the importance of each of the indexes with reference to the index setting information, and determine a visual variable which is allocated to each of the indexes based on the visual variable setting information and the importance of each of the indexes specified.

7 Claims, 8 Drawing Sheets

(51) Int. Cl.
*G06Q 10/0637* (2023.01)
*G09G 3/20* (2006.01)

(52) U.S. Cl.
CPC .............. *G09G 2310/0264* (2013.01); *G09G 2320/0666* (2013.01); *G09G 2320/10* (2013.01)

(56) References Cited

U.S. PATENT DOCUMENTS

2018/0189990 A1* 7/2018 Cardno ................. G06T 11/206
2021/0211364 A1* 7/2021 Feldmann ............. H04L 43/062

FOREIGN PATENT DOCUMENTS

WO  WO-2020172913 A1 * 9/2020
WO  WO-2021055243 A1 * 3/2021 ............. G06F 16/26

OTHER PUBLICATIONS

Carpendale, "Considering Visual Variables as a Basis for Information Visualisation," University of Calgary, Department of Computer Science, 2003, 2001-693-16, 20 pages.

Chang et al., "WireVis: Visualization of categorical, time-varying data from financial transactions," 2007 IEEE Symposium on Visual Analytics Science and Technology, 2007, pp. 155-162.

Halik, "The analysis of visual variables for use in the cartographic design of point symbols for mobile Augmented Reality applications," Geodesy and Cartography, 2012, 61(1):19-30.

Hayashi et al., "A Visual Analytics Tool for System Logs Adopting Variable Recommendation and Feature-Based Filtering," 17th International Conference on Information Visualisation, London, 2013, pp. 1-10.

Urabe et al., "Study of Business Process Visualization Method using Operation Log," IEICE Technical Report, Mar. 2019, 118(483):83-88, 9 pages.

Yagi et al., "A Visualization Technique of Multiple Window Usage for Operational Process Understanding," IEICE Technical Report, Nov. 8, 2018, 118(303):27-32, 14 pages (with English Translation).

* cited by examiner

Fig. 1

| FACTORS | HIGH IMPORTANCE | INTERMEDIATE IMPORTANCE | LOW IMPORTANCE |
|---|---|---|---|
| FINDING OF HESITATION OR MISTAKE | (APPEARANCE FREQUENCY OF RARE WINDOW TITLES, NUMBER OF OPERATIONS ON SINGLE GUI) | PROPORTION OF NON-OPERATIONAL TIME | – |
| FINDING OF VOLUME OF RETRIEVALS | (NUMBER OF WINDOW SWITCHES, NUMBER OF DISPLAY WINDOWS) | – | – |
| FINDING OF REPEATED OPERATION | (NUMBER OF OPERATIONS ON SINGLE GUI, NUMBER OF COPY AND PASTE OPERATIONS) | VARIATION IN INPUT VALUE | (NUMBER OF WINDOW SWITCHES, NUMBER OF DISPLAY WINDOW TITLES) |

| VISUAL VARIABLE | SELECTIVITY | RELEVANCE | QUANTITATIVITY | SEQUENCE |
|---|---|---|---|---|
| HUE | ○ | ○ | × | × |
| LUMINANCE | ○ | ○ | × | ○ |
| SATURATION | ○ | ○ | × | ○ |
| TRANSPARENCY | △ | ○ | × | ○ |
| TEXTURE | ○ | ○ | × | × |

DISPLAY CONTROL DEVICE, DISPLAY CONTROL METHOD, AND DISPLAY CONTROL PROGRAM

CROSS-REFERENCE TO RELATED APPLICATIONS

This application is a National Stage application under 35 U.S.C. § 371 of International Application No. PCT/JP2019/027815, having an International Filing Date of Jul. 12, 2019, the disclosure of which is considered part of the disclosure of this application, and is incorporated in its entirety into this application.

TECHNICAL FIELD

The present invention relates to a display control device, a display control method, and a display control program.

BACKGROUND ART

Work improvement activities of companies are generally performed in a cycle of "confirmation of work states," "analysis of problems," "review of improvement plans," and "execution and evaluation of improvement plans." In the step of "confirmation of work states," analog work analysis schemes of manual hearing, observation time measurement, and the like adopted in many fields have been used in some cases. When such work analysis schemes are used, there is a prejudice toward subjective viewpoints of some workers in addition to the work involved. Therefore, there is a problem that, for example, analysis results depend on individuals or the completeness of data may be insufficient. As a solution to the above problem, the dependency on individuals can be excluded by acquiring and visualizing operation logs of terminals, and it is possible to confirm work states more efficiently, completely, and finely. Here, as data items acquired as the operation logs, for example, user names, terminal names, application names, window titles, URLs/file paths, window handles, and the like can be considered.

As examples in which visualization is used for work analysis, visualization in a timeline format (see NPL 1) and visualization in a flow format (see NPL 2) are generally known.

The visualization in a timeline format is a visualization method of allocating a time to the x axis (or the y axis), allocating an element to the y axis (or the x axis), and expressing consecutive times of respective elements with a rectangle (hereinafter referred to as timeline display), and is appropriate for intuitively ascertaining an anteroposterior relation and a co-occurrence relation between the elements. According to the technology disclosed in NPL 1, based on a log of transition between active and inactive states of a window, timeline display in a usage state of a window on a terminal is realized.

The visualization in a flow format is a visualization method of setting work, a job, or an operation as one node and expressing transitions between nodes as links (hereinafter referred to as flow display), and is appropriate for ascertaining procedures in which work/jobs/operation transitions. According to the technology disclosed in NPL 2, based on identification information of an order number or the like, flow display is realized by overlapping processes in units of operations.

The operation log visualization technologies for analyzing work in the related art (see NPL 1 and NPL 2) are effective when observation targets (specific dates, users, orders, or the like) are narrowed down and then target work states are ascertained. However, since the number of people who are work analysis targets is in the range of tens to hundreds of people and a period which is a work analysis target is a long period in many cases, it is necessary to handle a large number of operation logs. For users in fields who are not analysis or visualization experts, it is difficult to find points to be noticed and investigated in a large amount of operation log data.

As schemes appropriate to express a large amount of data, it is general to perform visualization in a heatmap format (see NPL 3 and NPL 4). The visualization in the heatmap format is a visualization scheme in which magnification of a value is expressed using color (hue/saturation/luminance) and indicates that, in particular, elements are allocated to axes perpendicular to each other and are disposed with rectangles in a grid pattern in the present specification (hereinafter referred to as heatmap display). The heatmap display is appropriate for overlooking a large amount of data since the elements do not overlap each other on a screen and the heatmap display is easily visually understood even if an area occupied by each of rectangles is small.

On the other hand, viewpoints of work analysis are various. For example, as one viewpoint, there is a viewpoint of finding work which can be a bottleneck on work and is a time-consuming job. As another viewpoint, there is a viewpoint of finding typical work which is repeatedly performed.

Also, when focusing on one viewpoint, there may be various factors. For example, as factors causing "time-consuming job," as described above, when hesitation or a mistake occurs due to occurrence of a job different from a normal job (factor 1), it may take time to perform retrieval until necessary information is obtained due to the distribution of the information (factor 2) in some cases.

To efficiently find these factors in operation logs, it is necessary not only to visualize features that appear in a single operation log (hereinafter referred to as an index) and it is necessary to handle combinations of multiple indexes and be able to express noteworthy points in a format in which the importance of indexes can be visually distinguished.

For example, in the case of factor 1, when an input is repeated through an operation different from a normal operation on the same GUI, it is conceivable that there will be a high probability of hesitation or a mistake occurring at that point and that there will be an increase or a decrease in non-operational times before and after this point. Therefore, a usage rate (a) of an application file different from a normal application file, a non-operational time (b), and the number of operations on the same GUI (c) are combined as indexes, the indexes (a) and (c) may be handled as having high importance, the index (b) may be handled as having low importance, and these may be expressed using differing visual features (hereinafter referred to as visual variables) such as luminance or hue.

In the case of factor 2, when a user switches between a plurality of files in which necessary information of a user is listed or an explorer is opened sequentially to configure a deep hierarchical folders, it is conceivable that it takes time to retrieve information. Therefore, it is effective to combine the number of window switches or the number of display windows as an index.

CITATION LIST

Non Patent Literature

[NPL 1] Sayaka Yagi, Yuki Urabe, Kimio Tsuchikawa, Takeshi Masuda, "A Visualization Technique of Multiple Window Usage for Operational Process Understanding," IEICE Technical Report, vol. 118, no. 303, ICM 2018-29, pp. 27 to 32, November 2018.

[NPL 2] Yuki Urabe, Sayaka Yagi, Kimio Tsuchikawa, Takeshi Masuda, "Study of Business Process Visualization Method using Operation Log," IEICE Technical Report, vol. 118, no. 483, ICM 2018-64, pp. 83 to 88, March 2019.

[NPL 3] R. Chang, M. Ghoniem, R. Kosara, W. Ribarsky, J. Yang, E. Suma, and A. Sudjianto, "Wirevis: Visualization of categorical, time-varying data from financial transactions," In 2007 IEEE Symposium on Visual Analytics Science and Technology, pp. 155 to 162, IEEE, 2007.

[NPL 4] A. Hayashi, T. Itoh and S. Nakamura, "A Visual Analytics Tool for System Logs Adopting Variable Recommendation and Feature-Based Filtering", 2013 17th International Conference on Information Visualisation, London, pp. 1-10, 2013.

[NPL 5] J. Bertin, W. J. Berg, and H. Wainer. Semiology of graphics: diagrams, networks, maps. Vol. 1. No. 0. Madison: University of Wisconsin press, 1983.

[NPL 6] M. S. T. Carpendale, "Considering Visual Variables as a Basis for Information Visualisation," University of Calgary, Department of Computer Science, 2001-693-16, 2003.

[NPL 7] Halik, "The analysis of visual variables for use in the cartographic design of point symbols for mobile Augmented Reality applications," Geodesy and Cartography, vol. 61, no. 1, pp. 19 to 30, 2012.

SUMMARY OF THE INVENTION

Technical Problem

In the heatmap display of the related art (NPL 3 and NPL 4), however, combinations of a plurality of indexes are not expressed simultaneously. Therefore, it is difficult to ascertain the plurality of indexes on a heatmap simultaneously. For example, the technology disclosed in NPL 3 does not handle multivariable since elements allocated to the axes of a heatmap are fixed. In the technology disclosed in NPL 4, total values of selected variables are expressed with color, but there is a problem that a plurality of variables are not displayed simultaneously. Accordingly, to solve the foregoing problems, for example, an objective of the present invention is to express combinations of a plurality of indexes simultaneously in heatmap display.

Means for Solving the Problem

To solve the foregoing problems, a display control device includes: processing circuitry configured to: store index setting information indicating combinations of a plurality of indexes and importance of each of the indexes, and visual variable setting information indicating a visual variable used when a value of the index of the importance is displayed for each importance on a heatmap; calculate values of the indexes collectively on a display basis on the heatmap; specify the combinations of the plurality of indexes and the importance of each of the indexes with reference to the index setting information; and determine a visual variable which is allocated to each of the indexes based on the visual variable setting information and the importance of each of the indexes specified.

Effect of the Invention

According to the present invention, for example, it is possible to express combinations of a plurality of indexes related to user operations simultaneously in heatmap display.

BRIEF DESCRIPTION OF DRAWINGS

FIG. 1 is a diagram illustrating an example of index setting information according to an embodiment.

DESCRIPTION OF EMBODIMENTS

Hereinafter, a mode for carrying the present invention (an embodiment) will be described with reference to the drawings. The present invention is not limited to the following embodiment.

[Overview] First, an overview of a display control device according to the embodiment will be described with reference to FIGS. 1 to 3. The display control device analyzes work content of a user from various viewpoints based on operation logs of the user and performs a heatmap display of the analysis results on a screen.

The operation logs are information indicating terminal information, login user information, information regarding an application which is an operation target of the user on a terminal screen, operation content, an operation time, and the like. The display control device displays the operation logs collectively on a display basis and calculates values of various indexes indicating operation content of the user.

The display control device has information (index setting information) indicating which combination of indexes related to a user operation should be use for performing work analysis from a viewpoint for each viewpoint (factor) of the work analysis (see FIG. 1).

For example, when "occurrence point of hesitation or mistake" is desired to be found as a work problem, as in the index setting information illustrated in FIG. 1, it is conceivable that an appearance frequency of rare window titles and the number of operations on a single GUI are set as indexes with high importance and a proportion of a non-operational time be set as an index with intermediate importance.

When a value of each of the indexes is calculated based on the operation logs, the display control device allocates a visual variable (luminance, saturation, hue, and the like) in accordance with importance of each index. Then, the display control device performs heatmap display of the values of the indexes using the allocated visual variables (see FIG. 2). In the heatmap display illustrated in FIG. 2, the x axis represents a time and the y axis represents a user ID and a date on which a user with the user ID performs an operation.

For example, a case in which the display control device allocates "luminance" to an index with high importance and allocates "hue" to an index with intermediate importance will be considered.

In this case, the display control device allocates "luminance" to "appearance frequency of rare window titles, number of operations on single GUI" which is an index with high importance and allocates "hue" to an index "proportion of non-operational time" with intermediate importance upon performing work analysis from the viewpoint of "finding of hesitation or mistake."

Figure 2:
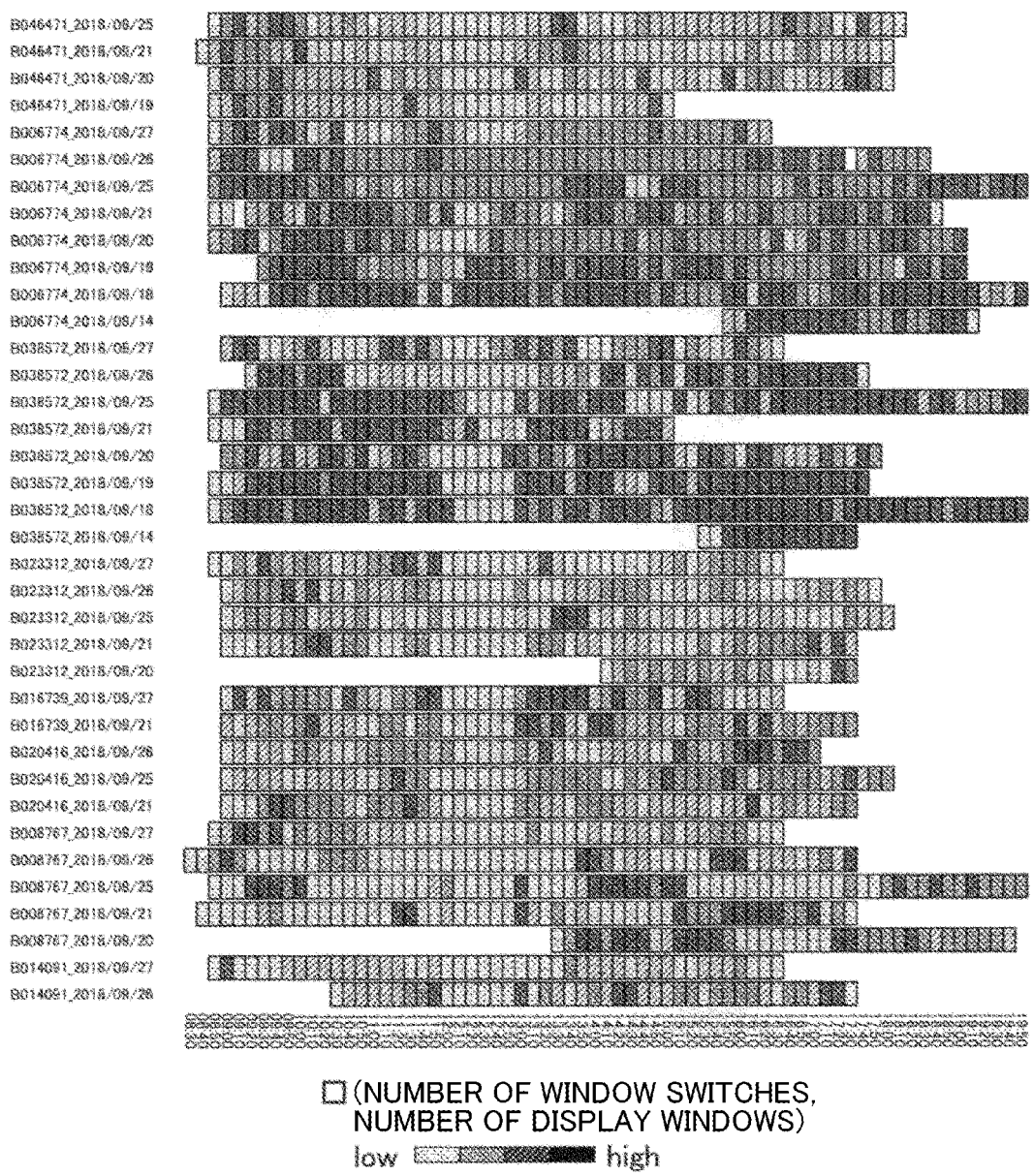
FIG. 2 is a diagram illustrating an example of heatmap display from a viewpoint of "finding of hesitation or mistake" according to the embodiment.

For example, when a value of the appearance frequency of the rare window title and a value of the number of operations on the single GUI at each time period are calculated based on the operation logs, the display control device raises luminance of a rectangle indicating the time period as the value of the appearance frequency of the rare window title and the value of the number of operations on the single GUI is larger (see FIG. 2).

For example, when a value of the proportion of the non-operational time is calculated in each time period based on the operation logs, the display control device may bring a rectangle indicating a time period to certain color as the value of the proportion of the non-operational time is higher (see FIG. 2).

The display control device sets an index upon performing work analysis from the viewpoint of "finding of volume of retrievals" to "number of window switches, the number of display window," raises the importance of these indexes (see FIG. 1), and allocates "luminance."

Figure 3:
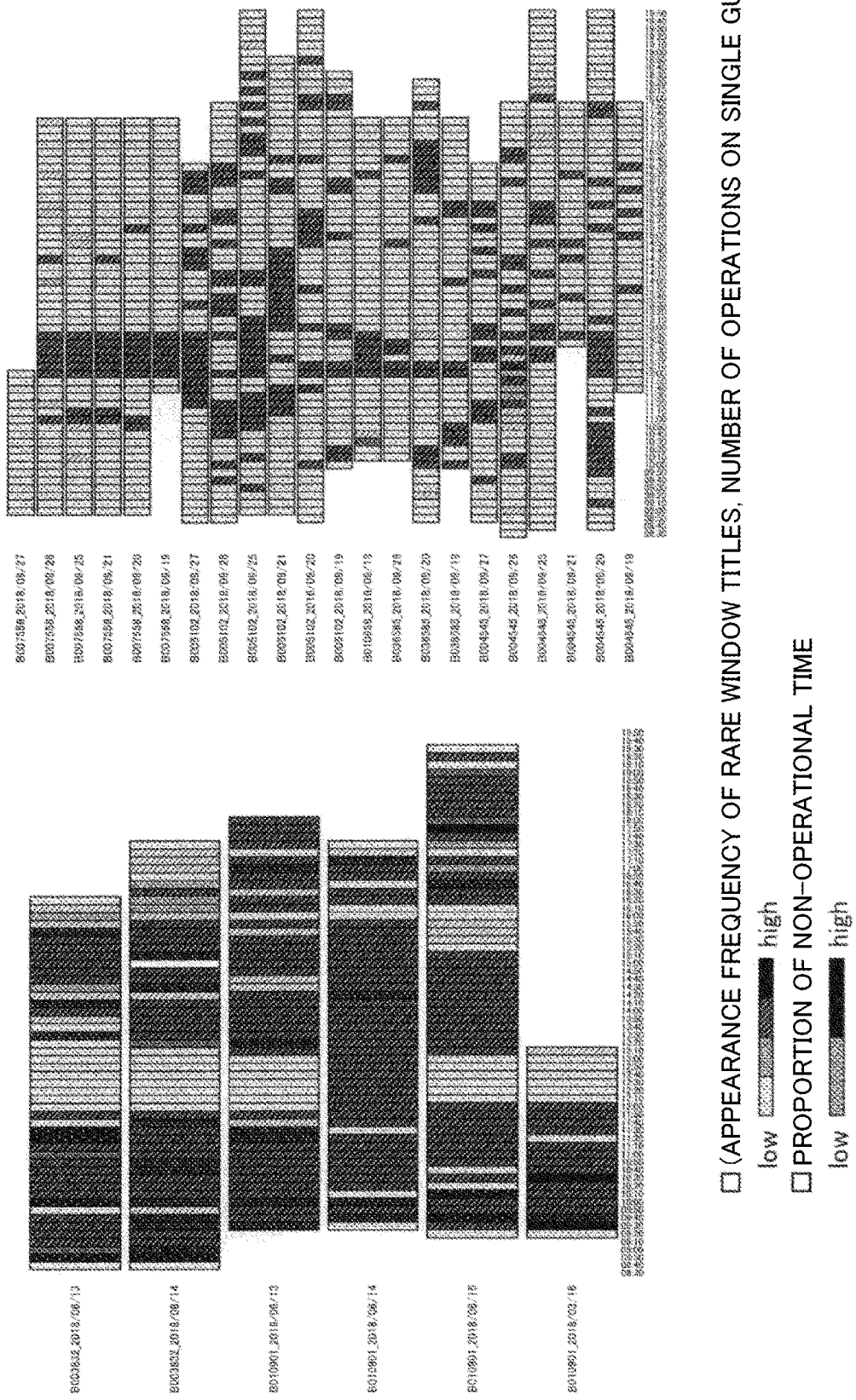
FIG. 3 is a diagram illustrating an example of the heatmap display from a viewpoint of "finding of volume of retrievals" according to the embodiment.

When a value of the number of window switches and a value of the number of display windows are calculated in each time period based on the operation logs, the display control device raises luminance of a rectangle indicating a time period in the time period in which the value of the number of window switches and the value of the number of display windows are larger (see FIG. 3).

In this way, the display control device can simultaneously perform the heatmap display of the values of the plurality of indexes calculated from the operation logs. From each viewpoint of work analysis, the display control device determines a visual variable used for the heatmap display allocated to the index in accordance with height of the importance of the index used for work analysis of the viewpoint. As a result, the display control device easily performs the work analysis when the user performs the work analysis, viewing the heatmap display of the values of the plurality of indexes.

For example, the display control device performs the foregoing heatmap display on a large amount of operation logs, and thus the user can intuitively ascertain points to be noticed as candidates for work problem points along with the importance. By investigating the candidates for the work problem points found by the user while taking peripheral information (previous and subsequent time periods or a procedure) into consideration in a timeline, a process, or the like, it is possible to examine factors of a problem.

[Configuration] First, operation logs used by a display control device 10 will be described. The operation logs are information indicating terminal information, login user information, information regarding an operation target application of a user on a terminal screen, operation content, and an operation time. The information regarding the operation target application of the user is, for example, a user name, a terminal name, an application name, a window title, a URL/file path, and a window handle.

In the embodiment, a window state obtained from the operation logs is assumed to be one of the following states in description.

An active state: the window is activated;
An inactive state: the window is not activated, but is displayed on a desktop; and
A non-operation state: a state in which no user operation is performed for a predetermined time or more.

The following indexes are assumed as indexes which can be calculated based on window information and user operations included in the operation logs.

(1) When an operation is noticed at a window level,
the number of window switches: the number of active window switches;
the number of display windows: the number of kinds of displayed windows;
the number of display applications/window titles: the number of kinds of displayed applications/window titles;
a proportion of non-operational time: a proportion of a time in which a non-operation state is occupied;
an appearance frequency of a rare application/window titles: an appearance frequency of a rare application/window title; and
a usage proportion of a rare application/window title: a proportion of a time in which an active state of a rare application/window title is occupied.

(2) When a user operation such as a mouse click or a key input is noticed,
the number of operations: the number of user operations (a GUI basis or a specific operation basis is also possible); and
A variation in an input value: the number of kinds of values input to each GUI.

The rare application/window title is, for example, assumed to be an application/window title in which an appearance frequency is within a designated proportion from a lower value in a target basis (work/user/period or the like).

Figure 4:
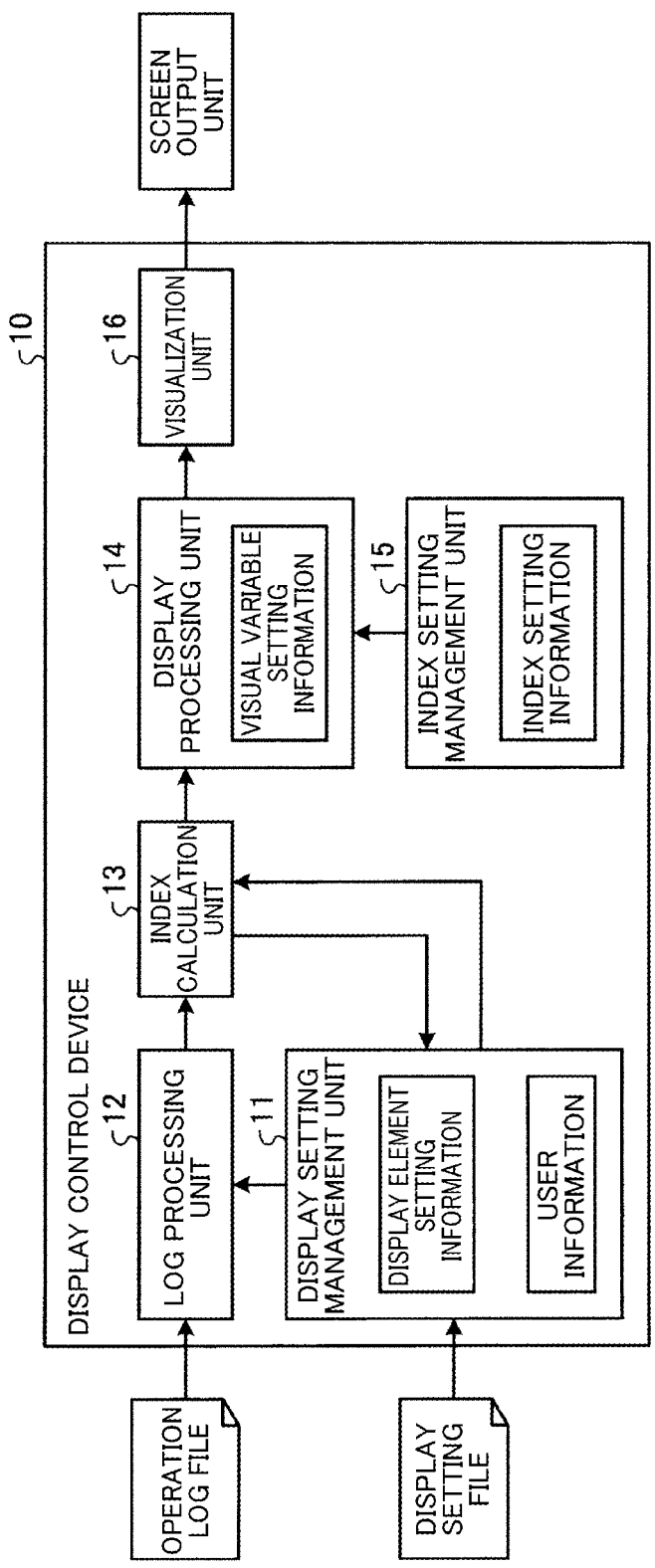
FIG. 4 is a diagram illustrating a configuration example of a display control device according to the embodiment.

Next, a configuration example of the display control device 10 will be described with reference to FIG. 4. The display control device 10 includes, for example, a display setting management unit 11, a log processing unit 12, an index calculation unit 13, a display processing unit (visual variable determination unit) 14, an index setting management unit 15, and a visualization unit 16.

The display setting management unit 11 keeps display element setting information and the user information. The display element setting information is information indicating setting content of each display element in heatmap display. The user information is, for example, information indicating work in which a user with a user ID engages for each user ID. For example, the display setting management unit 11 generates the display element setting information by reading known setting from a display setting file related to the heatmap display. The display setting management unit 11 transmits the display element setting information to the log processing unit 12.

The log processing unit 12 processes operations logs. For example, when the operation log file is read, the log processing unit 12 generates event data in which the operation logs are displayed collectively on a display basis based on the display element setting information received from the display setting management unit 11. The log processing unit 12 transmits the generated event data to the index calculation unit 13.

The index calculation unit 13 calculates a value of an index of a user operation. For example, the index calculation unit 13 divides the event data received from the log processing unit 12 at intervals of a predetermined time width. Subsequently, the index calculation unit 13 inquires of the display setting management unit 11 about the user information as necessary. Then, the index calculation unit 13 calculates a value of an index for each predetermined time width based on the user information, the divided event data, and the index information and generates display data for displaying the calculated value of the index. Then, the index calculation unit 13 transmits the display data to the display processing unit 14.

The display processing unit 14 has visual variable setting information. The visual variable setting information is, for example, information indicating a visual variable (for example, luminance, saturation, transparency, hue, texture, or the like) used when the value of the index with importance is displayed on a heatmap for each importance of the index. The details of the visual variable setting information will be described later giving a specific example.

The display processing unit 14 determines a visual variable allocated to each index with reference to the importance of each index matching a determined viewpoint of work analysis and the visual variable setting information. Then, the display processing unit 14 determines a display state of a rectangle of the heatmap based on the visual variable allocated to each index and notifies the visualization unit 16 of the display state. The visual variable allocated to a rectangle included in the heatmap is, for example, the luminance, the saturation, the transparency, the hue, the texture, or the like. The display processing unit 14 determines the display state of the rectangle of the heatmap based on the visual variable allocated to each index and transmits the display state to the visualization unit 16.

The index setting management unit 15 has the index setting information (see FIG. 1). The index setting information is information indicating a combination of indexes used for work analysis from a viewpoint and the importance of each of the indexes for each viewpoint of the work analysis.

For example, when inquiry about the combination of indexes matching the viewpoint of the work analysis and the importance of each of the indexes is received from the display processing unit 14, the index setting management unit 15 specifies the combination of the indexes matching the viewpoint of the work analysis and the importance of each of the indexes based on the index setting information and notifies the display processing unit 14 of the combination of the indexes and the importance of each of the indexes. The combination of the indexes indicated by the index setting information from each viewpoint of the work analysis can be appropriately changed by the user of the display control device 10.

The visualization unit 16 configures a figure displayed on a screen based on the display state of the rectangle received from the display processing unit 14 and draws, for example, the heatmap display to a screen output unit such as a display.

The foregoing user information, display element setting information, index setting information, and visual variable setting information are stored in a storage device (a storage unit) such as a memory or a hard disk included in the display control device 10.

For example, the foregoing display control device 10 can also change and re-display the display basis, the time width, and the viewpoint of the work analysis in response to a user operation in addition to a user input unit (not illustrated) such as a mouse or a keyboard that receives the user operation and an operation target determination unit (not illustrated) that determines a GUI on which an operation is performed.

Figures 5, 6:
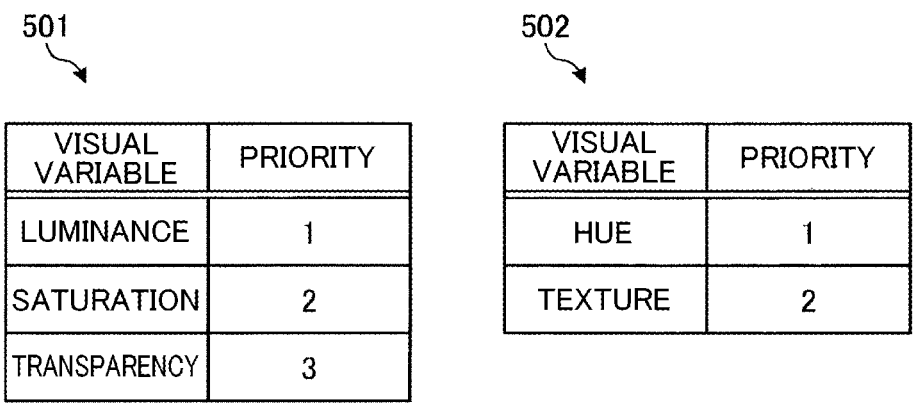
FIG. 5 is a diagram illustrating an example of a visual variable group allocated to importance variables included in visual variable setting information of FIG. 1.
FIG. 6 is a diagram illustrating an example of information indicating features of visual variables included in the visual variable setting information of FIG. 1.

[Visual variable setting information] Next, an example of the visual variable setting information will be described with reference to FIGS. 5 and 6. The visual variable setting information includes, for example, information illustrated in FIG. 5 and information illustrated in FIG. 6. FIG. 5 is a diagram exemplifying information (denoted by reference numeral 501) indicating a visual variable allocated to an index with high importance and information (denoted by reference numeral 502) indicating visual variables allocated to indexes with intermediate importance and low importance. The information is generated based on, for example, information indicating a feature of each visual variable illustrated in FIG. 6.

The information illustrated in FIG. 6 is information indicating the feature of each visual variable (luminance, saturation, transparency, hue, or texture). For example, in the information illustrated in FIG. 6, hue has features indicating that there are selectivity (the visual variable can be separated) and relevance but there is no quantitativity and no sequence (magnitude of a difference can be determined with a visual variable).

The display control device 10 selects a visual variable group (luminance, saturation, and transparency) that has sequence and selectivity and a visual variable group (hue and texture) that has selectivity with reference to, for example, information indicating a feature of each visual variable illustrated in FIG. 6. The display control device 10 generates a table (denoted by reference numeral 501 of FIG. 5) indicating the visual variable group (luminance, saturation, and transparency) that has sequence and selectivity and a table (denoted by reference numeral 502 of FIG. 5) indicating the visual variable group (hue and texture) that has selectivity.

For example, when there is an index group $X=\{x_1, x_2, \ldots, x_n\}$ (where n is the number of indexes), an importance variable corresponding to a combination of the indexes with high importance, an importance variable $I_2$ corresponding to a combination of the indexes with intermediate importance, and an importance variable $I_3$ corresponding to a combination of the indexes with low importance can be expressed by the following Expression (1).

[Math. 1]

$$I_1=f_1(x_1,\ldots,x_n), I_2=f_2(x_1,\ldots,x_n), I_3=f_3(x_1,\ldots,x_n)$$

Expression (1)

For example, the display control device 10 allocates the visual variables (luminance, saturation, and transparency) that have sequence and selectivity to the importance variable $I_1$, as denoted by reference numeral 501 of FIG. 5. The display control device 10 allocates the visual variables (hue and texture) that have selectivity to the importance variables $I_2$ and $I_3$, as denoted by reference numeral 502 of FIG. 5.

The reason why the display control device 10 allocates luminance, saturation, and transparency to the importance variable $I_1$ and allocates hue and texture to the importance variables $I_2$ and $I_3$, as described above, is that luminance, saturation, and transparency are not simultaneously applied, and the determination can be performed although hue and texture are simultaneously applied.

The visual variable setting information may include information indicating priority of each visual variable. For example, as denoted by reference numeral 501 of FIG. 5, each of the visual variables (luminance, saturation, and transparency) that have sequence and selectivity may include information indicating priority of each visual variable. As denoted by reference numeral 502 of FIG. 5, each of the visual variables (hue and texture) that have selectivity may include information indicating priority of each visual variable. The display processing unit 14 determine the visual variable by taking the priority into consideration when the visual variable allocated to each importance variable is determined.

For example, the display processing unit 14 determines "luminance" with highest priority among the visual variables denoted by reference numeral 501 as the visual variable allocated to the importance variable $I_1$. The display processing unit 14 determines "hue" with highest priority among the visual variables denoted by reference numeral 502 as the visual variable allocated to the importance variables $I_2$ and $I_3$.

The visual variable setting information may further include information indicating visual variables which can be combined in the heatmap display. The display processing unit 14 may determine the visual variables with reference to the information indicating the visual variables which can be combined in the heatmap display when the visual variables allocated to each importance variable (for example, importance variables $I_1$, $I_2$, and $I_3$) are determined.

The visual variables are not limited to the luminance, saturation, transparency, hue, and texture illustrated in FIG. 6 and may be other visual elements such as a size and a shape. The size can have all the elements of selectivity, relevance, quantitativity, and sequence. Accordingly, when "size" is used for each visual variable in the heatmap display, for example, the display control device 10 may allocate "size" to the importance variable $I_1$, allocate "luminance, saturation, and transparency" to the importance variable $I_2$, and allocate "hue and texture" to the importance variable $I_3$.

[Processing procedure] Next, an example of a processing procedure of the display control device 10 will be described. First, an example of a processing procedure of the index calculation unit 13 of the display control device 10 will be described with reference to FIG. 7.

The index calculation unit 13 divides the event data received from the log processing unit 12 for each determined time width (S1). After S1, when it is determined that there is the index calculated for each work (Yes in S2), the index calculation unit 13 inquires of the display setting management unit 11 about the user information with reference to, for example, the index information or the like (S3). Thereafter, when the user information is received from the display setting management unit 11, the index calculation unit 13 calculates the value of the index for time width based on the user information, the event data divided for each time width, and the index information. Then, the index calculation unit 13 generates the display data indicating the value of the index for each time width (S4). Thereafter, the index calculation unit 13 notifies the display processing unit 14 of the display data (S5).

Conversely, when it is determined in S2 that there is no index calculated for each work (No in S2), the index calculation unit 13 calculates the value of the index for each time width based on the index information and the event data divided for each time width and generates the display data indicating the calculated value of the index for each time width (S4). Then, the index calculation unit 13 performs a similar process to S5.

Next, an example of the processing procedure of the display processing unit 14 of the display control device 10 will be described with reference to FIG. 8.

First, the display processing unit 14 inquires of the index setting management unit 15 about the priority (importance) and the combination of the indexes used for the work analysis (S11) and receives the combination of the indexes used for the work analysis and the priority from the index setting management unit 15. Subsequently, the display processing unit 14 defines the importance variables (for example, the importance variables $I_1$, $I_2$, and $I_3$) based on the priority and the combination of the indexes received from the index setting management unit 15 (S12). The display processing unit 14 determines the visual variables allocated to each importance variable based on the visual variable setting information (S13).

Figure 7:
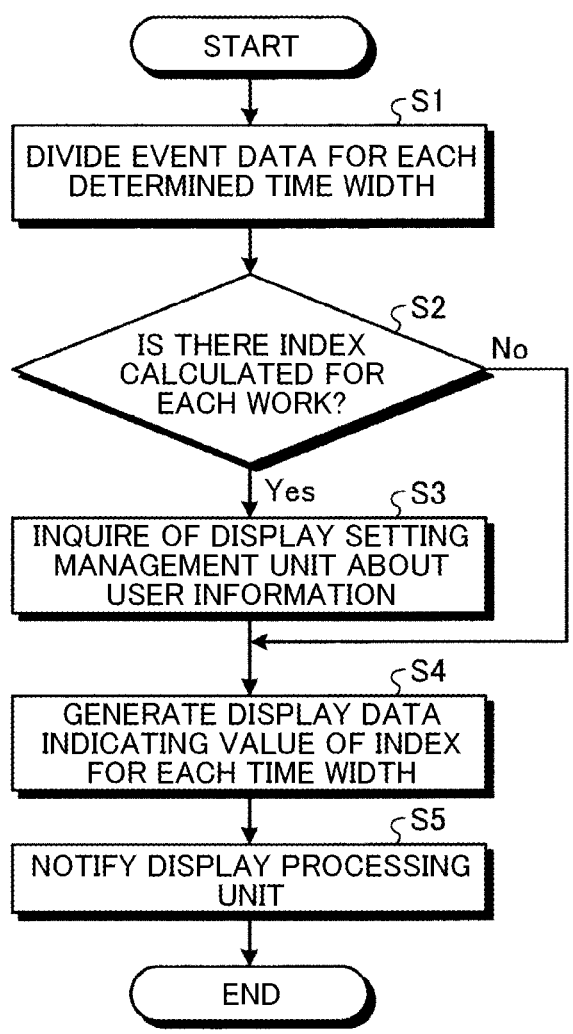
FIG. 7 is a flowchart illustrating an example of a processing procedure of a display processing unit of FIG. 4.
Figure 8:
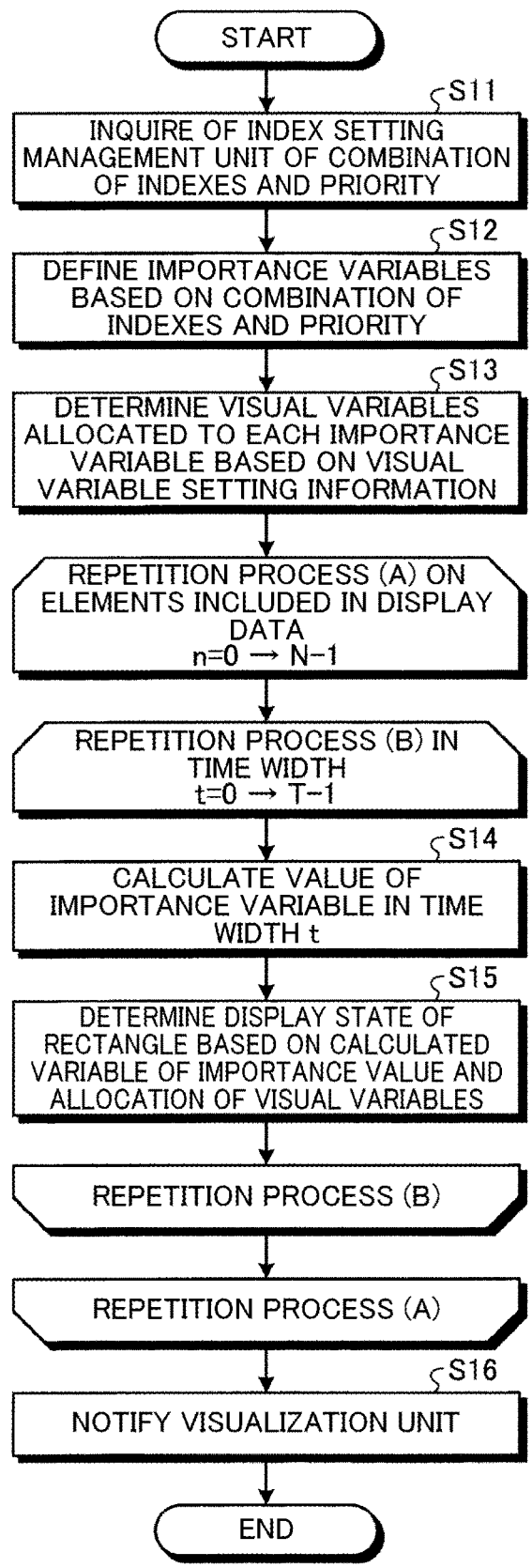
FIG. 8 is a flowchart illustrating an example of a processing procedure of an index calculation unit of FIG. 4.

After S13, the display processing unit 14 performs a process (S14) of calculating the value of the importance variable in a time width t (t=0 to T−1) on an element n (where n=0 to N−1) included in the display data notified of in S5 of FIG. 7 and a process (S15) of determining the display state of the rectangle based on the calculated value of the importance variable and the allocation of the visual variables (a repetition process (B) and a repetition process (A) illustrated in FIG. 8). The display processing unit 14 notifies the visualization unit 16 of the display state of the rectangle determined in the repetition process (A) when the repetition process (A) ends (S16).

[Example of Determination of Display State of Rectangle] Next, an example of a process of determining the display state of the rectangle in the display control device 10 upon selecting "finding of hesitation or mistake" from the example illustrated in FIG. 1 as the viewpoint of work analysis will be described.

Here, indexes used in "finding of hesitation or mistake" are the appearance frequency of rare window titles, the number of operations on the single GUI, and the proportion of the non-operational time (see the index setting information illustrated in FIG. 1). It is assumed that $x_1$ is the appearance frequency of rare window titles, $x_2$ is the number of operations on the single GUI, and $x_3$ is the proportion of the non-operation.

At this time, a normalized value $nv_{it}$ of each index in the time width t is calculated with the following Expression (2).

[Math. 2]

$$nv_{it} = \frac{v_{imax} - v_{it}}{v_{imax} - v_{imin}} \qquad \text{Expression (2)}$$

Here, in Expression (2), $v_{it}$ indicates a total value (a real number) of the indexes, and $v_{imax}$ and $v_{imin}$ indicate a maximum value and a minimum value in a unit (for example, work) in which each index value is calculated. The unit of normalization can be changed to be appropriate for an analysis purpose such as work, a user, or a period. For example, when each index is normalized for each work, the display processing unit 14 associates work with a user using the user information.

For example, here, a case in which $f_1$ and $f_2$ in the foregoing Expression (1) are calculated with the following Expression (3) will be considered.

[Math. 3]

$$f_1 = f_2 = \Sigma_{i=0}^{n} x_i \cdot w_i \text{ ($w_i$ is a weight for each index)} \qquad \text{Expression (3)}$$

In this case, each importance variable is expressed as in the following Expression (4) by setting a weight of an index which is in the combination of the indexes with each importance to 1 and setting a weight of the other indexes to 0.

[Math. 4]

$$I_{1t}=nv_{1t}+nv_{2t}, I_{2t}=nv_{3t} \quad \text{Expression (4)}$$

Numbers for causing each visual variable to keep selectivity and relevance are about 5 to 7 (see NPL 6). Therefore, the display control device 10 may digitize each importance variable to a number with which the visual variable can be separated as necessary.

For example, when the information denoted by reference numerals 501 and 502 of FIG. 5 is set as the visual variable setting information, the display processing unit 14 allocates luminance with priority "1" to the importance variable $I_1$ in the visual variable group (see reference numeral 501) that has sequence. The display processing unit 14 allocates hue of priority "1" to the importance variable $I_2$ in the visual variable group (see reference numeral 802) that has selectivity. That is, when the importance variable $I_1$: luminance and the importance variable $I_2$: hue are set and, for example, the HSL color system is adopted as the color of each rectangle in the heatmap display, the luminance and the hue are obtained with the following Expression (5).

$$H_t=f_H(I_{2t}), S_t=c_S, L_t=F_L(I_{1t}) \quad \text{Expression (5)}$$

Here, in Expression (5), $c_S$ is a constant, $f_H$ is a formula for obtaining hue, and $f_L$ is a formula for obtaining luminance.

The above-described display control device 10 can simultaneously express the combinations of the plurality of indexes related to a user operation in the heatmap display. The display control device 10 has the index setting information, and thus can change the combinations of the indexes displayed on the heatmap in accordance with the viewpoint of work analysis. The display control device 10 has the visual variable setting information, and thus can visually distinguish and express the importance between the indexes. The foregoing visual variable setting information and index setting information can be changed, and thus the display control device 10 can flexibly change the visual variables allocated to the indexes displayed on the heatmap. In the embodiment, the indexes used for the work analysis related to the user operation have been described. For example, indexes used for traffic analysis, sales prediction, or the like may be used in addition to work analysis.

[Program] A program that realizes the functions of the display control device 10 described in the foregoing embodiment can be installed to be mounted on a desired information processing device (a computer). For example, by causing the information processing device to execute the program provided as package software or online software, it is possible to cause the information processing device to function as the display control device 10. The information processing device mentioned herein includes a desktop or laptop personal computer and a rack-mounted server computer. In addition, a mobile communication terminal such as a smartphone, a mobile phone, or a personal handyphone system (PHS) and personal digital assistants (PDAs) are included in a category of the information processing device. The display control device 10 may be mounted on a cloud server.

Figure 9:
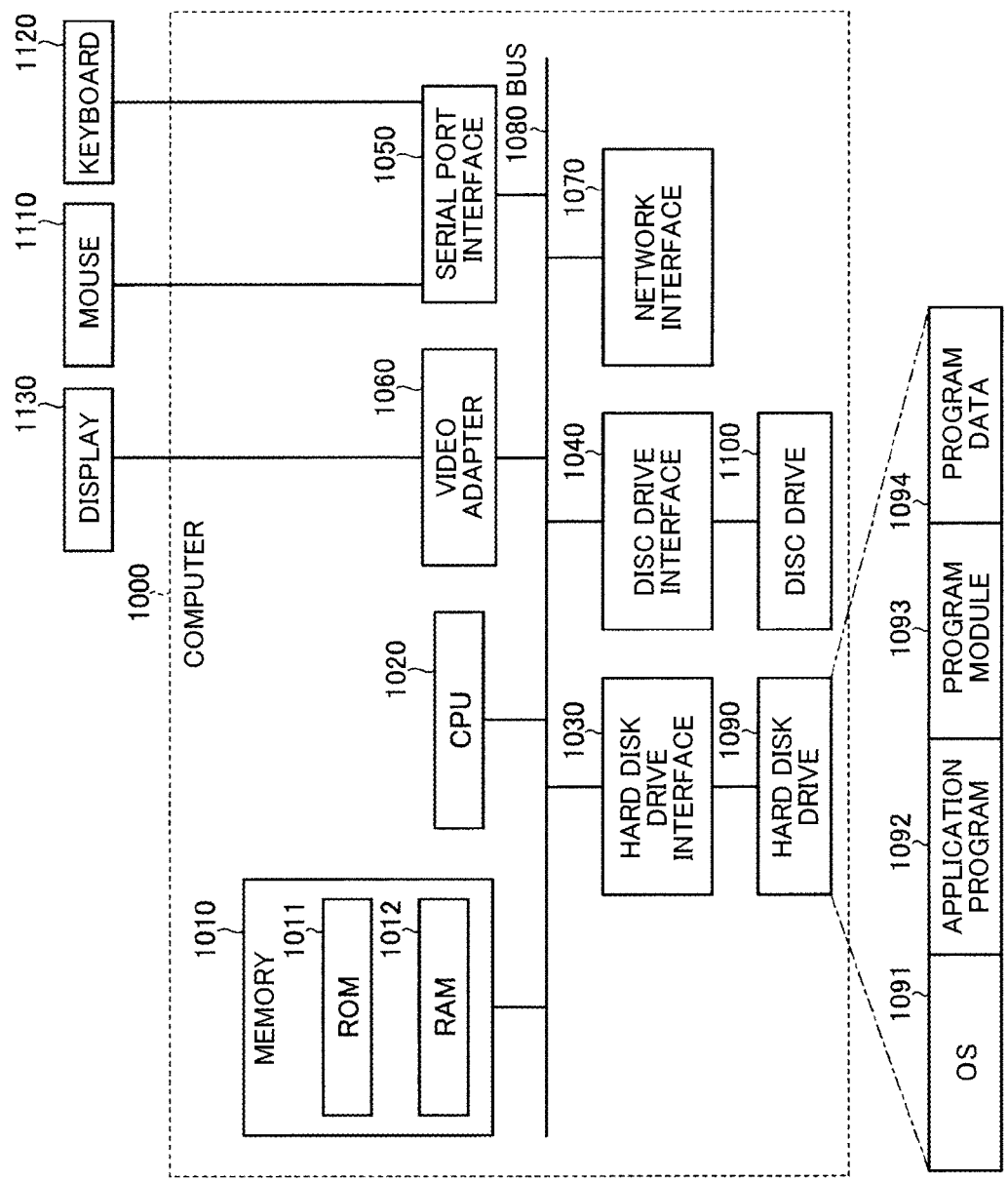
FIG. 9 is a diagram illustrating an example of a computer that executes a display control program.

An example of a computer that executes the foregoing program (a display control program) will be described with reference to FIG. 9. As illustrated in FIG. 9, a computer 1000 includes, for example, a memory 1010, a CPU 1020, a hard disk drive interface 1030, a disc drive interface 1040, a serial port interface 1050, a video adapter 1060, and a network interface 1070. These units are connected by a bus 1080.

The memory 1010 includes a read-only memory (ROM) 1011 and a random access memory (RAM) 1012. The ROM 1011 stores, for example, a boot program such as a basic input output system (BIOS). The hard disk drive interface 1030 is connected to a hard disk drive 1090. The disc drive interface 1040 is connected to a disc drive 1100. For example, a detachably mounted storage medium such as a magnetic disk or an optical disc is inserted into the disc drive 1100. For example, a mouse 1110 and a keyboard 1120 are connected to the serial port interface 1050. For example, a display 1130 is connected to the video adapter 1060.

Here, as illustrated in FIG. 9, the hard disk drive 1090 stores, for example, an OS 1091, an application program 1092, a program module 1093, and program data 1094. The index setting information, the visual variable setting information, the display element setting information, and the user information described in the foregoing embodiment are stored in, for example, the hard disk drive 1090 or the memory 1010.

The CPU 1020 reads the program module 1093 or the program data 1094 stored in the hard disk drive 1090 to the RAM 1012 as necessary to execute the above-described sequences.

The program module 1093 or the program data 1094 related to the foregoing display control program are not limited to a case in which the program module 1093 or the program data 1094 are stored in the hard disk drive 1090. For example, the program module 1093 or the program data 1094 may be stored in a detachably mounted storage medium to be read by the CPU 1020 via the disc drive 1100 or the like. Alternatively, the program module 1093 or the program data 1094 related to the foregoing program may be stored in another computer connected via a network of LAN or a wide area network (WAN) to be read by the CPU 1020 via the network interface 1070.

REFERENCE SIGNS LIST

10 Display control device
11 Display setting management unit
12 Log processing unit
13 Index calculation unit
14 Display processing unit
15 Index setting management unit
16 Visualization unit

The invention claimed is:

1. A display control device comprising:
   processing circuitry configured to:
   store (a) index setting information indicating combinations of a plurality of indexes and an importance level of each of the indexes, and (b) visual variable setting information indicating a visual variable used when a value of the index of the importance level is displayed for each importance level on a heatmap;
   automatically process logs to determine event data at a predetermined time interval, and calculate values of the indexes for each predetermined time interval based on the event data;
   divide the plurality of indexes into multiple groups including a first group of indexes corresponding to a first importance level and a second group of indexes corresponding to a second importance level; and allocate, based on the visual variable setting information, a first visual variable to the first group of indexes corresponding to the first importance level and a second visual variable to the second group of indexes corresponding to the second importance level; and display a heatmap expressing (i) the first group of indexes using the first visual variable according to the values of indexed included in the first group of indexes and (ii) the second group of indexes using the second visual variable according to the values of indexes included in the second group of indexes.

2. The display control device according to claim 1, wherein, for each viewpoint of work analysis, the index is an index related to a user operation used for the work analysis from the viewpoint, and wherein the processing circuitry is further configured to display information related to the user operation collectively on a display basis on the heatmap and calculate the values of indexes.

3. The display control device according to claim 1, wherein the visual variable setting information further includes one or more visual variables which are usable upon displaying the values of the indexes of the importance level on the heatmap and information indicating priority of each of the one or more visual variables, and wherein, when determining the visual variable of each of the indexes, the processing circuitry is further configured to determine the visual variable based on the priority of each of the one or more visual variables in the visual variable setting information.

4. The display control device according to claim 2, wherein the index related to the user operation is at least one of a number of window switches, a number of display windows, a number of display applications, a number of display window titles, a proportion of non-operational time, an appearance frequency of a rare application or an application, a usage proportion of the rare application or the application, a number of operations, and a variation in an input value in the user operation.

5. The display control device according to claim 1, wherein the visual variable is at least one of hue, luminance, saturation, transparency, texture, a size, and a shape of a rectangle used for display on the heatmap.

6. A display control method comprising:

storing (a) index setting information indicating combinations of a plurality of indexes and an importance level of each of the indexes, and (b) visual variable setting information indicating a visual variable used when a value of the index of the importance level is displayed for each importance level on a heatmap;

automatically process logs to determine event data at a predetermined time interval, and calculating values of the indexes for each predetermined time interval based on the event data;

dividing the plurality of indexes into multiple groups including a first group of indexes corresponding to a first importance level and a second group of indexes corresponding to a second importance level; and allocating, based on the visual variable setting information, a first visual variable to the first group of indexes corresponding to the first importance level and a second visual variable to the second group of indexes corresponding to the second importance level; and displaying a heatmap expressing (i) the first group of indexes using the first visual variable according to the values of indexed included in the first group of indexes and (ii) the second group of indexes using the second visual variable according to the values of indexes included in the second group of indexes.

7. A non-transitory computer-readable recording medium storing therein a display control program that causes a computer to execute a process comprising:

storing (a) index setting information indicating combinations of a plurality of indexes and an importance level of each of the indexes, and (b) visual variable setting information indicating a visual variable used when a value of the index of the importance level is displayed for each importance level on a heatmap;

automatically process logs to determine event data at a predetermined time interval, and calculating values of the indexes for each predetermined time interval based on the event data;

dividing the plurality of indexes into multiple groups including a first group of indexes corresponding to a first importance level and a second group of indexes corresponding to a second importance level; and allocating, based on the visual variable setting information, a first visual variable to the first group of indexes corresponding to the first importance level and a second visual variable to the second group of indexes corresponding to the second importance level; and displaying a heatmap expressing (i) the first group of indexes using the first visual variable according to the values of indexed included in the first group of indexes and (ii) the second group of indexes using the second visual variable according to the values of indexes included in the second group of indexes.

\* \* \* \* \*